(12) United States Patent
McGrew (10) Patent No.: US 11,650,422 B2
(45) Date of Patent: May 16, 2023

(54) ACTIVE CORRECTION OF ABERRATIONS IN OPTICAL SYSTEMS

(71) Applicant: Vuzix Corporation, West Henrietta, NY (US)

(72) Inventor: Stephen Paul McGrew, Spokane, WA (US)

(73) Assignee: Vuzix Corporation, West Henrietta, NY (US)

(*) Notice: Subject to any disclaimer, the term of this patent is extended or adjusted under 35 U.S.C. 154(b) by 6 days.

(21) Appl. No.: 16/758,699

(22) PCT Filed: Oct. 19, 2018

(86) PCT No.: PCT/US2018/056643
§ 371 (c)(1),
(2) Date: Apr. 23, 2020

(87) PCT Pub. No.: WO2019/083828
PCT Pub. Date: May 2, 2019

(65) Prior Publication Data
US 2020/0341277 A1 Oct. 29, 2020

Related U.S. Application Data

(60) Provisional application No. 62/575,835, filed on Oct. 23, 2017.

(51) Int. Cl.
*G02B 27/01* (2006.01)

(52) U.S. Cl.
CPC ........ *G02B 27/0172* (2013.01); *G02B 27/017* (2013.01); *G02B 2027/011* (2013.01);
(Continued)

(58) Field of Classification Search
CPC .......... G02B 27/0172; G02B 2027/011; G02B 2027/0116; G02B 2027/0174
See application file for complete search history.

(56) References Cited

U.S. PATENT DOCUMENTS

3,796,480 A 3/1974 Preston et al.
3,904,274 A 9/1975 Feinleib et al.
(Continued)

FOREIGN PATENT DOCUMENTS

EP 0046873 A1 3/1982

OTHER PUBLICATIONS

United States Patent & Trademark Office (ISA/US), International Search Report and Written Opinion in PCT/US2018/056643, , dated Feb. 14, 2019.
(Continued)

*Primary Examiner* — Roy P Rabindranath
(74) *Attorney, Agent, or Firm* — Harter Secrest & Emery LLP; Jacob D. Merrill, Esq.

(57) ABSTRACT

A method and apparatus for correcting aberrations over the entire field of view of an optical system, in which a first part of the apparatus applies different pre-compensating aberrations individually to different portions of the field of view, such that aberrations caused by a second part of the apparatus cancel the aberrations applied by the first part. The first part of the apparatus is temporally, angularly, or spatially multiplexed and the second part of the apparatus is spatially or angularly multiplexed such that ray bundles corresponding to subsets of contiguous pixels in an image source are each subjected to corresponding pre-compensating aberrations and subsequent aberrations, resulting in a substantially non-aberrated performance over the entire field of view of the optical system.

16 Claims, 11 Drawing Sheets

(52) U.S. Cl.
CPC ............ *G02B 2027/0116* (2013.01); *G02B 2027/0174* (2013.01)

(56) References Cited

U.S. PATENT DOCUMENTS

| | | | |
|---|---|---|---|
| 3,907,407 A | 9/1975 | Vilkomerson et al. | |
| 4,157,863 A | 6/1979 | Clark | |
| 4,909,611 A | 3/1990 | Spooner | |
| 5,170,283 A | 12/1992 | O'Brien et al. | |
| 5,488,505 A | 1/1996 | Engle | |
| 5,493,439 A | 2/1996 | Engle | |
| 5,561,548 A | 10/1996 | Engle | |
| 5,606,451 A | 2/1997 | Kim et al. | |
| 5,659,418 A | 8/1997 | Yurke | |
| 5,659,637 A * | 8/1997 | Bagley, Jr. | G06E 3/005 382/280 |
| 5,844,711 A | 12/1998 | Long | |
| 5,903,383 A | 5/1999 | Bernstein et al. | |
| 5,959,777 A | 9/1999 | Whitehead | |
| 5,999,307 A | 12/1999 | Whitehead et al. | |
| 6,215,920 B1 | 4/2001 | Whitehead et al. | |
| 6,304,365 B1 | 10/2001 | Whitehead | |
| 6,377,383 B1 | 4/2002 | Whitehead et al. | |
| 6,384,979 B1 | 5/2002 | Whitehead et al. | |
| 6,437,921 B1 | 8/2002 | Whitehead | |
| 6,452,734 B1 | 9/2002 | Whitehead et al. | |
| 6,574,025 B2 | 6/2003 | Whitehead et al. | |
| 6,865,011 B2 | 3/2005 | Whitehead et al. | |
| 6,885,496 B2 | 4/2005 | Whitehead et al. | |
| 6,891,658 B2 | 5/2005 | Whitehead et al. | |
| 7,164,536 B2 | 1/2007 | Whitehead | |
| 7,894,122 B2 | 2/2011 | Reynolds | |
| 2002/0063913 A1* | 5/2002 | Nakamura | G02B 27/0172 359/15 |
| 2006/0039046 A1 | 2/2006 | Ouchi et al. | |
| 2010/0149073 A1 | 6/2010 | Chaum et al. | |
| 2013/0187950 A1 | 7/2013 | Nowatzyk | |
| 2015/0226950 A1 | 8/2015 | Booth et al. | |
| 2016/0033771 A1 | 2/2016 | Tremblay et al. | |
| 2016/0048018 A1* | 2/2016 | De Matos Pereira Vieira | H04N 13/344 359/13 |
| 2016/0238845 A1 | 8/2016 | Alexander et al. | |
| 2017/0154464 A1* | 6/2017 | Lanier | G02B 27/017 |
| 2018/0267309 A1* | 9/2018 | Klug | H04N 9/3102 |
| 2019/0101763 A1* | 4/2019 | Ihmels | G02B 27/0172 |
| 2020/0209630 A1* | 7/2020 | Schultz | G02B 5/1823 |

OTHER PUBLICATIONS

Kogelnik (1969) "Coupled-wave theory forthick hologram gratings," Bell System Technical Journal 48(9): 2909-2947.

Maimone et al. (Jul. 2017) "Holographic Near-Eye Displays for Virtual and Augmented Reality," ACM Transactions on Graphics 36(4): 1-16.

Holoeye Photonics AG, Pluto Phase Only Spatial Light Modulators, Rev. 4.2 (2015).

* cited by examiner

ACTIVE CORRECTION OF ABERRATIONS IN OPTICAL SYSTEMS

TECHNICAL FIELD

This invention generally relates to optical imaging systems and to near-eye head-mounted displays that use an image projector to display virtual image content to a viewer.

BACKGROUND OF THE INVENTION

U.S. Patent Application number US2013/0187950 A1, (Nowatzyk), and the article, "Holographic Near-Eye Displays for Virtual and Augmented Reality" (Maimone et. al) ACM Transactions on Graphics, Vol. 36, No. 4, Article 85. Publication date: July 2017, (collectively referred to herein as "the Microsoft approach") describe a display system with aberration correction.

Aberration correction is accomplished in the Microsoft approach by adjusting the spatial distribution of phase delays on the SLM, in small regions of the SLM corresponding to correspondingly small portions of the field of view. For a display having a useful pixel count, this results in an extremely small exit pupil (also known as "eyebox").

Head-Mounted Displays (HMDs) are being developed for a range of diverse uses, including military, commercial, industrial, fire-fighting, and entertainment applications. For many of these applications, there is value in forming a virtual image that can be visually superimposed over the real-world image that lies in the field of view of the HMD user. However, an image projected through a typical imaging optical system, including an optical system comprising a single optical element, e.g. a mirror with optical power, will develop optical aberrations. As is known to those skilled in the art, optical aberrations generally increase with an increase in the field of view (FOV). That is, and for a rotationally symmetric optical imaging system, the further away, radially, from the center of the field of view, the greater the optical aberrations.

Optical aberrations can severely constrain the design of near-eye displays and other optical imaging systems. Although optical aberrations for a very small field of view can be corrected using ordinary reflective, diffractive, or refractive optical elements, different portions of a large field of view typically require different corrections. An approach described herein allows correction over all portions of a large field of view.

There are benefits to a head-mounted optical imaging apparatus that corrects for optical aberrations and enables utilization of a larger FOV. Solutions that have been proposed tend to add additional optical elements to the optical imaging apparatus, thus making them heavy and bulky, because the additional elements add more weight and tend to require significant space.

Thus, it can be appreciated that there would be advantages to a display apparatus that corrects for optical aberrations to form wide FOV virtual image content.

SUMMARY OF THE INVENTION

The present disclosure is intended to advance the art of virtual image presentation when using compact head-mounted devices and similar imaging apparatus. Advantageously, embodiments of the present disclosure provide an optical imaging apparatus that forms a virtual image having a wide field of view (FOV) without significant optical aberrations. This can allow greater visibility range and allow improved clarity and alignment overlay of the virtual image with the real-world scene content that lies in the FOV of the viewer.

These and other aspects, objects, features and advantages of the present disclosure will be more clearly understood and appreciated from a review of the following detailed description of the preferred embodiments and appended claims, and by reference to the accompanying drawings.

According to an aspect of the present disclosure, there is provided an imaging apparatus for forming a virtual image comprising: a source image, a first multiplexed element, a second multiplexed element, and an exit pupil; the first multiplexed element providing a first set of aberrations to ray bundles emanating from subsets of pixels of the source image, and the second multiplexed element providing a second set of aberrations to the ray bundles, such that the first set of aberrations is substantially canceled by the second set of aberrations.

According to another aspect of this disclosure, there is provided an imaging apparatus for forming a virtual image, the apparatus comprising a source image, a multiplexed optical element, a refractive, reflective, or diffractive optical element, and an exit pupil; the multiplexed element providing a first set of aberrations to ray bundles emanating from subsets of pixels of the source image, and the refractive, reflective, or diffractive optical element providing a second set of aberrations to the ray bundles, such that the first set of aberrations is substantially canceled by the second set of aberrations.

BRIEF DESCRIPTION OF THE DRAWING FIGURES

While the specification concludes with claims particularly pointing out and distinctly claiming the subject matter of the present invention, it is believed that the invention will be better understood from the following description when taken in conjunction with the accompanying drawings.

DETAILED DESCRIPTION OF THE INVENTION

The present description is directed to elements forming part of, or cooperating directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise.

In the context of the present disclosure, the terms "viewer", "operator", "observer", and "user" are equivalent and refer to the person who views images using the viewing device.

As used herein, the term "energizable" relates to a device or set of components that perform an indicated function upon receiving power and, optionally, upon receiving an enabling signal.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the term "combination" is similar to "inclusive OR": a combination of A, B, and C can be A, B, C, A and B, A and C, B and C, or A, B, and C.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. Virtual image display has several inherent advantages for augmented reality presentation. For example, the apparent size of a virtual image is not limited by the size or location of a display surface. Additionally, the source object for a virtual image may be small; a magnifying glass, as a simple example, can provide a virtual image of its object. In comparison with systems that project a real image, a more realistic viewing experience can be provided by forming a virtual image that appears to be some distance away. Providing a virtual image also obviates the need to compensate for screen artifacts, as may be necessary when projecting a real image.

The phrases "optical infinity" and "at infinity" as used herein corresponds to conventional usage in the camera and imaging arts, so that the focus distance exceeds at least about 4 m.

The phrase, "phase-only SLM" as used herein means any spatial light modulator (SLM) that can affect the phase of light incident on each of a plurality of locations on the SLM and is not intended to exclude a SLM that can independently control both the phase and amplitude of light at the plurality of locations.

Figure 1:
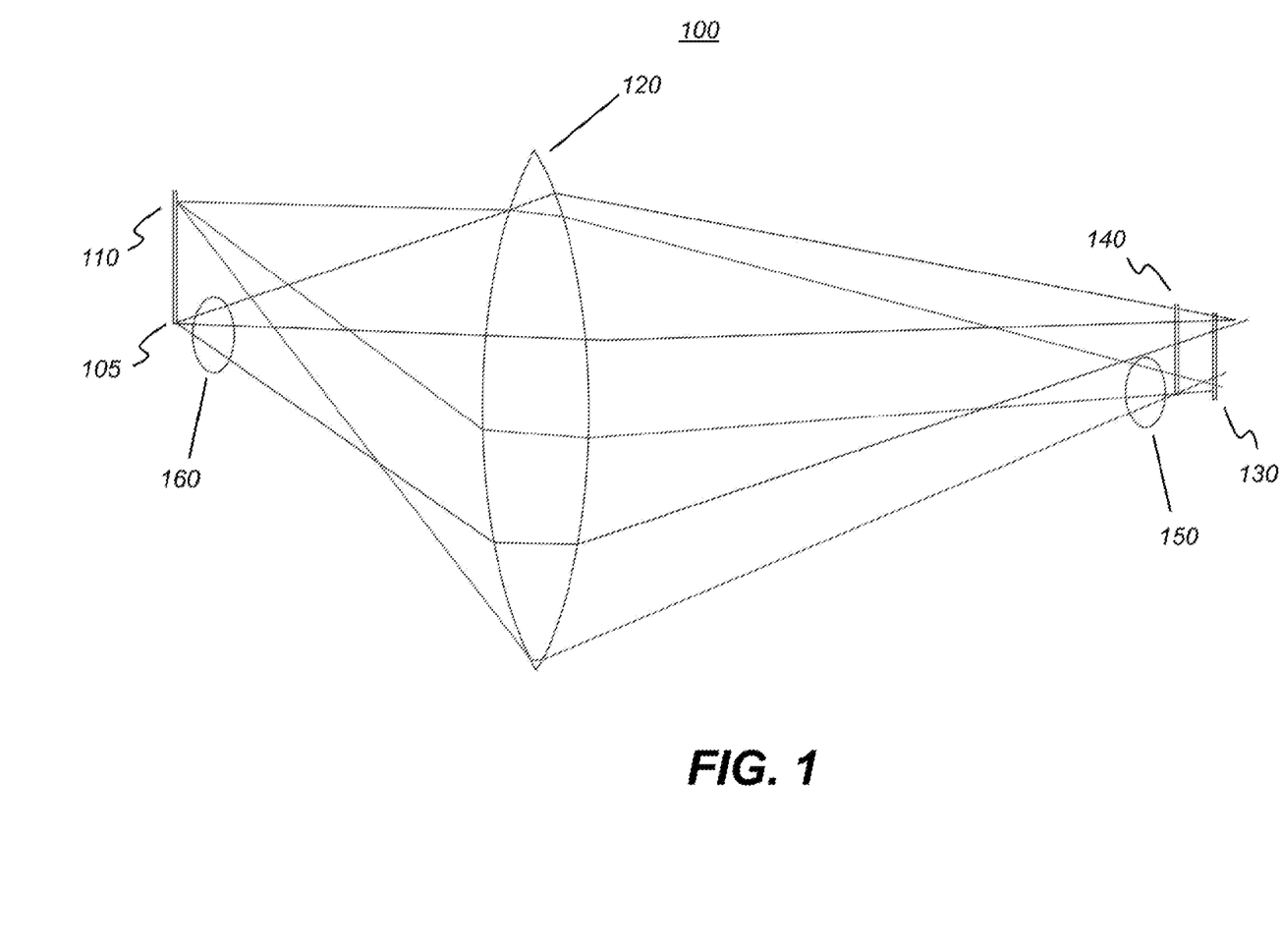
FIG. 1 is a schematic diagram that shows an optical imaging system with optical aberration.

FIG. 1 represents a general optical imaging system 100 with a source image 105. Optical sub-system 120, which may be reflective, refractive, or diffractive, and that may have one or multiple mirrors, lenses, or diffractive elements, forms an image 130 through exit pupil 140. Image 130 typically has aberrations as illustrated by rays 150, that originate from a single image point 110, and that fail to converge to a point at image 130.

Figure 2:
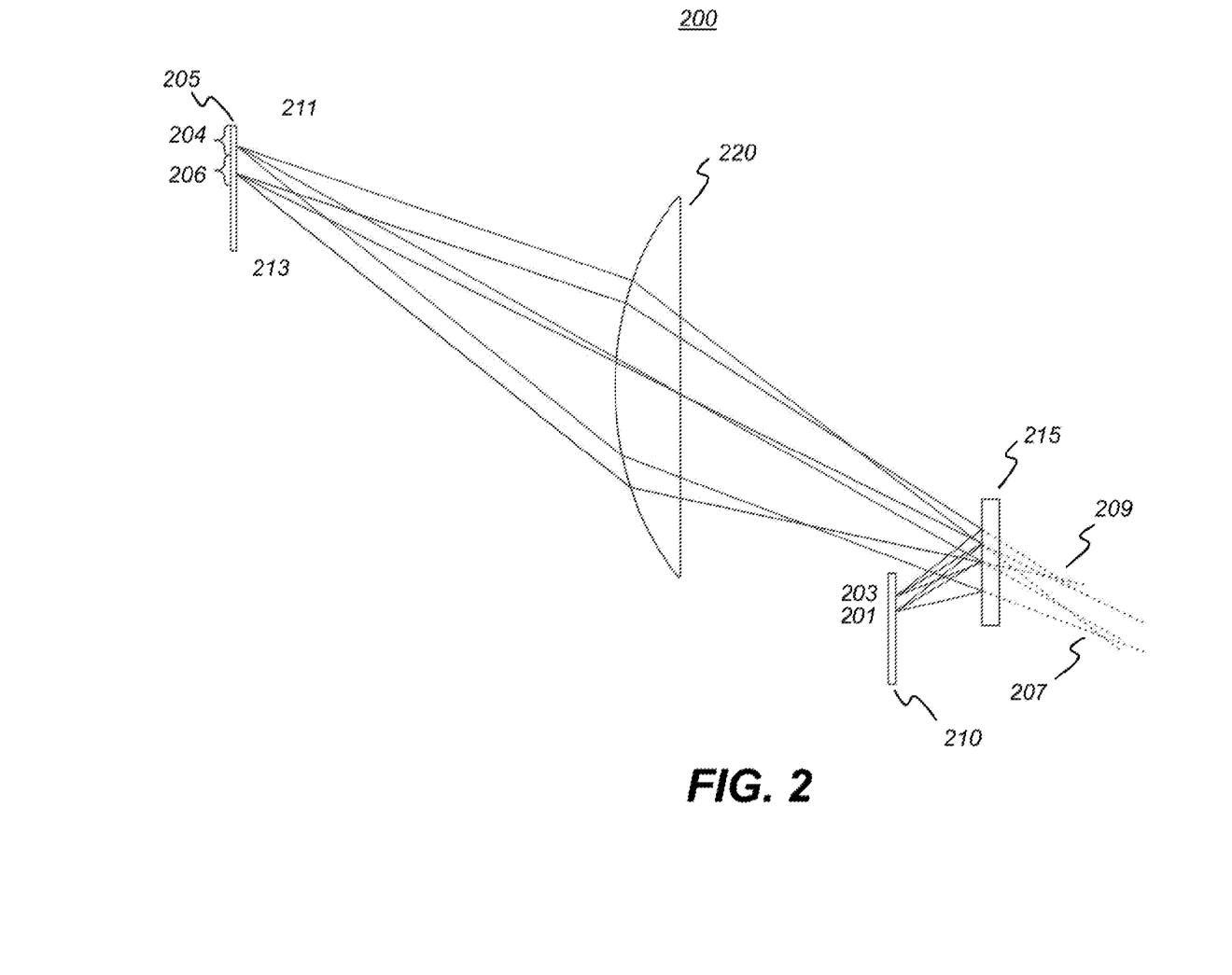
FIG. 2 is a schematic diagram that shows an optical imaging system with optical aberration correction according to one aspect of this disclosure.

FIG. 2 represents a general optical imaging system 200 with a source image 205 and an output image 210, similar to that in FIG. 1, except that an aberration correction element 215 is added. Without aberration correction element 215, rays from source image pixels 204, 206 in source image 205 would be brought to aberrated foci 207, 209. With aberration correction element 215, the rays from source image pixels 204, 206 are brought to sharp foci 201, 203. As is known to those skilled in the art of optical imaging design, when strong aberrations are induced by optical subsystem 220, it is impractical or impossible for a single aberration correction element 215 to bring the rays from a large (broad) source image to sharp foci.

Figure 3:
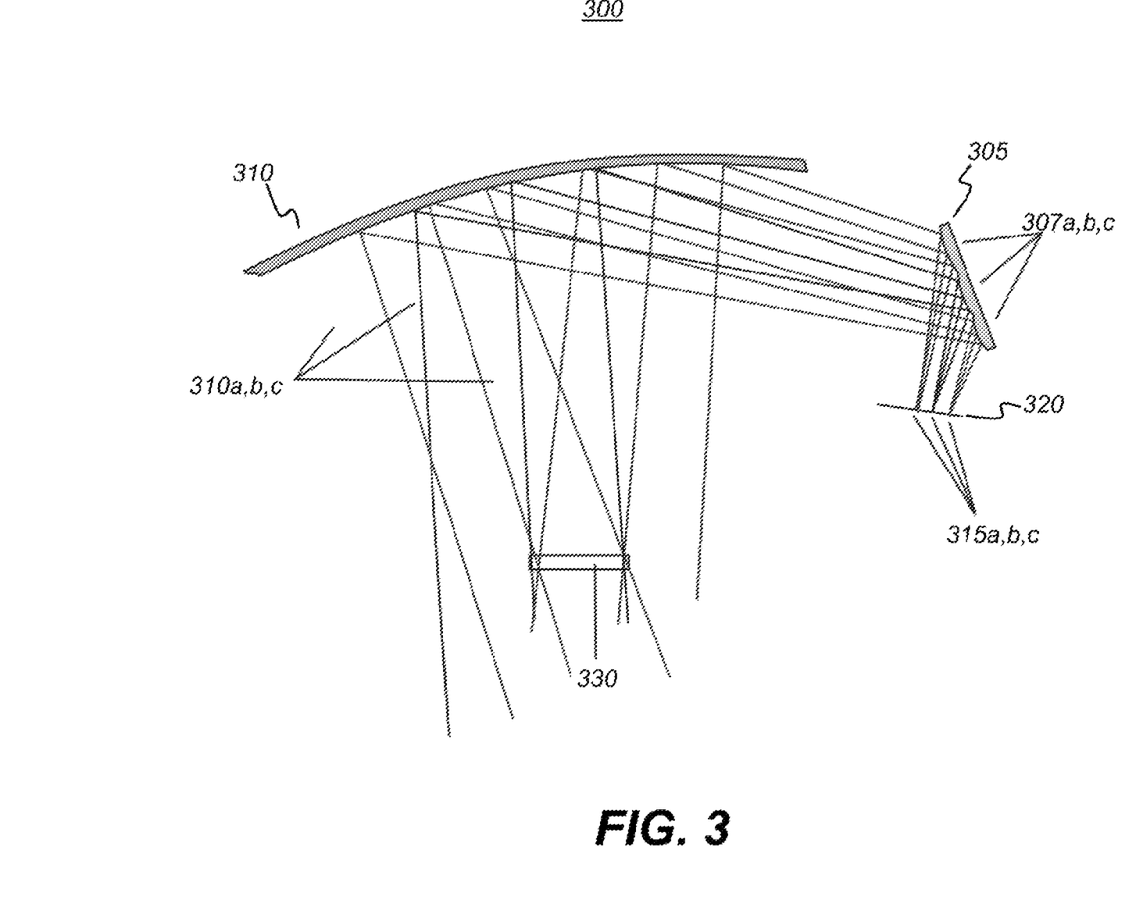
FIG. 3 is a schematic diagram that shows an optical imaging system with a curved mirror and an optical aberration correction element according to one aspect of this disclosure.

FIG. 3 represents an optical imaging system 300 with an aberration correction element 305 and imaging subsystem 310. The optical system 300 forms an output image at infinity, so it is effectively an inverted telescope. Aberration correction element 305 is subdivided into sub-elements 307*a,b,c* that apply a different, individually optimized aberration correction to rays from each of corresponding subsets of contiguous pixels 315*a,b,c* in source image 320. Because it is possible to obtain diffraction-limited performance for rays from a small source image, if each subset of pixels is small enough it is possible according to the present disclosure to obtain diffraction-limited performance for a large source image if the source image is divided into small enough subsets, and each subset is individually and separately aberration-corrected by a corresponding element 307*a,b,c*. The disadvantage of this arrangement is that it necessarily has a small exit pupil 330.

Figure 4:
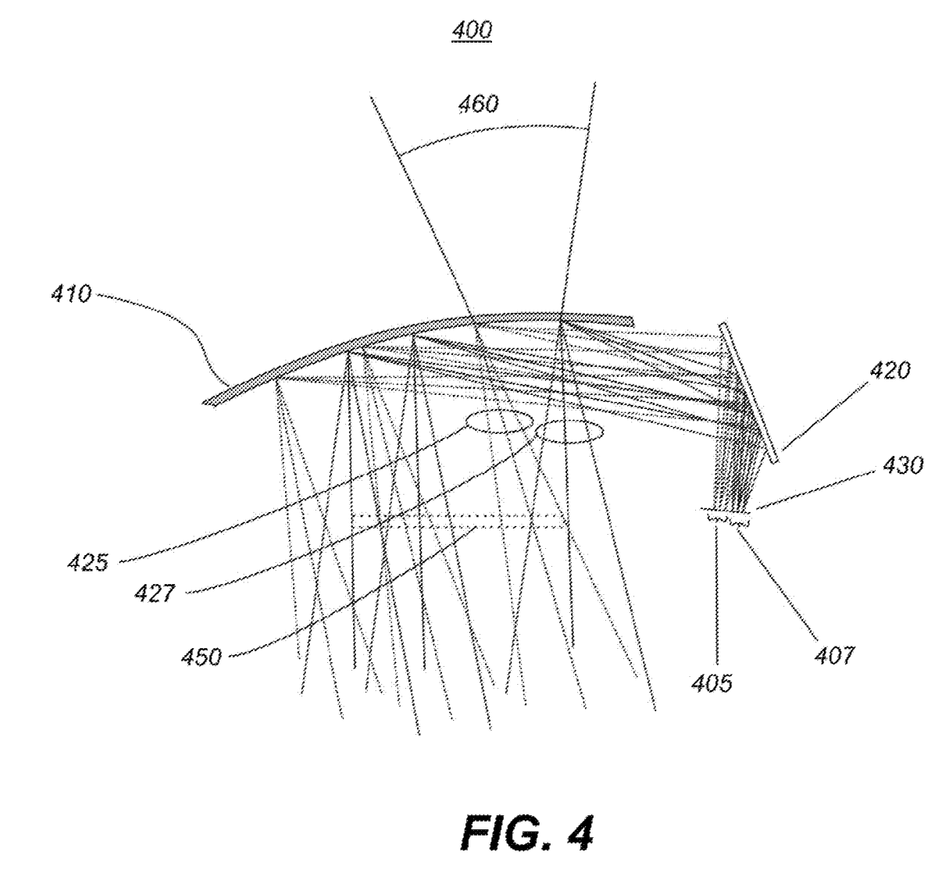
FIG. 4 is a schematic diagram of an optical imaging system with a first element for aberration correction and a second element for forming an exit pupil.

FIG. 4 represents an optical imaging system 400 comprising optical element 410, element 420, and source image 430. The system 400 has a field of view 460. In one arrangement, element 420 is an angularly multiplexed aberration correction volume diffractive element. Alternatively, element 420 can be a spatial light modulator (SLM). Subsets of contiguous pixels 405, 407 of source image 430 form ray bundles 425, 427 that are directed toward optical element 410 by corresponding overlapped sub-elements of element 420. Optical element 410 contains only one sub-element. Each sub-element of element 420 imposes aberrations on its corresponding ray bundle, opposite to aberrations subsequently imposed on the corresponding ray bundle by optical element 410, to form approximately collimated beams that pass through the exit pupil 450. Unless the number of sub-elements in element 420 is very large, the amount of residual aberration in the exit beams is unacceptable for a high-quality display system.

According to one aspect of the present disclosure, element 420 of FIG. 4 may be an angularly multiplexed diffractive optical element that applies different aberration correction to each of multiple ray bundles incident on element 420 within different angular ranges. In another arrangement, element 420 may be a spatial light modulator (SLM) that applies temporally multiplexed aberration correction to each of multiple different ray bundles incident on element 420 at different times. The size of the subset 405, 407 of source image 430 that can be made diffraction-limited is relatively small, and the exit pupil is correspondingly small, when element 410 is effectively a lens, mirror, or thin diffractive element with only one sub-element.

Figure 5:
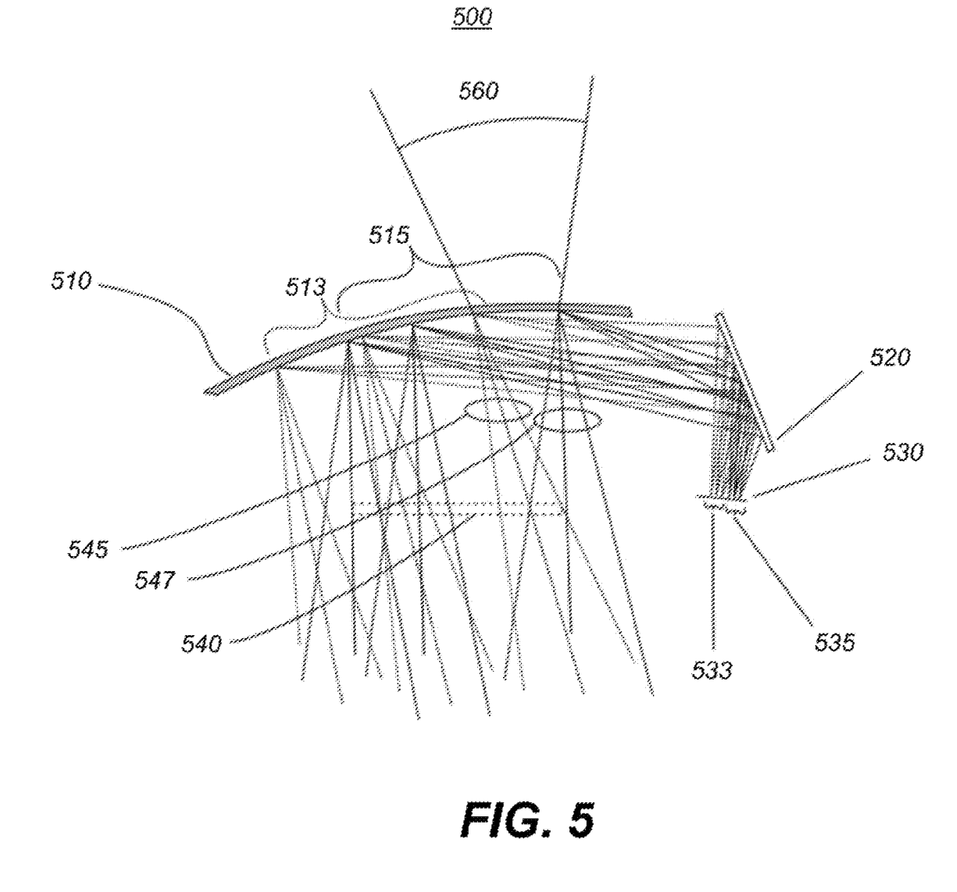
FIG. 5 is a schematic diagram that shows an aspect of the present disclosure that provides both a wide exit pupil and aberration correction for every part of the light field within the optical system, using a first multiplexed diffractive element and a second multiplexed diffractive element.

FIG. 5 is a schematic diagram that shows an aspect of the present disclosure that provides both a wide exit pupil and aberration correction for every part of the image. In FIG. 5, the optical imaging system 500 comprises two multiplexed elements 510 and 520, a source image 530, and exit pupil 540. Element 520 applies aberration corrections to each of multiple ray bundles 545, 547 incident on element 520 from source image 530, in advance of opposite aberrations applied to the ray bundles 545, 547 by multiplexed sub-elements of element 510. Optical imaging system 500 has a field of view 560.

In one arrangement, element 520 is a multiplexed holographic optical element. Each component of element 520 is designed to diffract only light rays incident from a corresponding contiguous subset (e.g., subset 535) of the pixels in image source 530, and to diffract those rays toward second element 510. A second multiplexed element 510 is, in one arrangement, a multiplexed holographic optical element, each component (e.g., component 515) of which is designed to diffract only light rays directed to said second multiplexed element 510 by said first element 520 and that are emitted from said corresponding subset (e.g., subset 535) of pixels in image source 530.

In one arrangement, first multiplexed holographic optical element 520 comprises a volume recording medium with a plurality of holographic sub-elements recorded therein, overlapping, within the volume of the medium. Any holographic sub-element is angularly selective to a degree that is well understood by skilled designers of volume diffractive optical elements. Angular selectivity of a volume holographic optical element is such that the holographic sub-element effectively only diffracts light incident from one range of angles at any given wavelength, or one range of wavelengths at any given angle. This fact is well described by Kogelnick ("Coupled-wave theory for thick hologram gratings", Bell System Technical Journal, 48(2909), 1969). The angular selectivity of a volume holographic optical element depends on the incident angles of the object and reference beams, the thickness of the recording medium, and the modulation depth of the Bragg gratings forming the holographic pattern in the element. Therefore, each sub-element of multiplexed holographic optical element 520 is recorded in such a way that its angular selectivity covers the angle range only of rays arriving from a corresponding subset of the pixels in image source 530.

In one arrangement, the second multiplexed holographic element, 510, also comprises a volume recording medium with a plurality of holographic sub-elements (e.g., 513, 515) recorded therein, overlapping, within the volume of the medium. Each sub-element of 510 is designed and recorded in such a way that its angular selectivity covers the angle range only of rays arriving to the first element 510 from a corresponding subset of the pixels in image source 530, e.g. subset 535 of image source 530.

Figure 6:
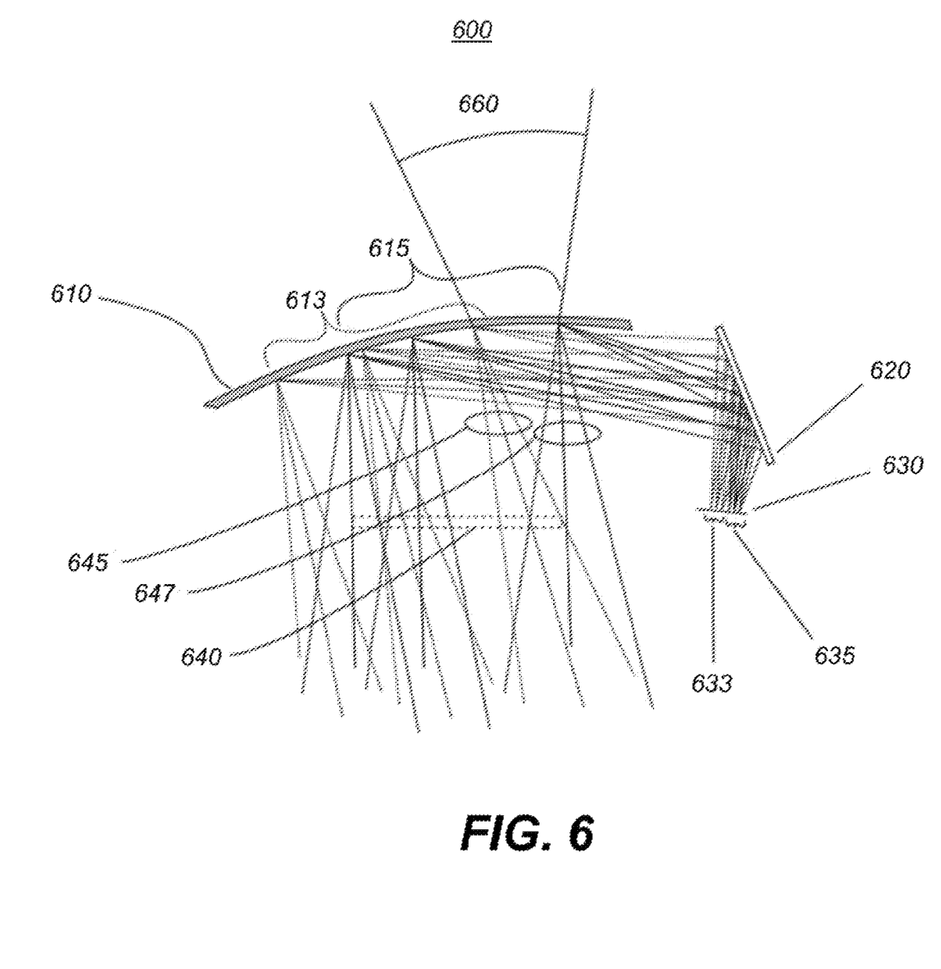
FIG. 6 is a schematic diagram that shows an optical system comprising an image source, a first element, a second element, and an exit pupil; where the second element causes aberrations to different portions of the light field within the optical system and the first element applies pre-compensatory aberrations to corresponding portions of the light field in a temporally multiplexed manner.

FIG. 6 is a schematic diagram that shows an optical imaging system 600 comprising an image source 630, a first element 620, a second element 610, and an exit pupil 640. In one arrangement, first element 620 is a spatial light modulator (SLM) (e.g., the PLUTO phase-only SLM made by HoloEye), capable of applying aberrations to ray bundles 645, 647 from pixel subsets 633, 635 of source image 630 to pre-compensate for aberrations caused by second element 610. The SLM switches sequentially between phase configurations, applying a different pre-compensation aberration with each phase configuration. In one arrangement, second element 610 is a multiplexed volume holographic optical element (HOE). Each sub-element 613, 615 of second element 610 is designed to collimate the ray bundle from each pixel in a corresponding subset 633, 635 of source image 630 pixels. Aberrations caused by the SLM 620 configurations are opposite to aberrations caused by corresponding sub-elements 613, 615 of second element 610. Because the pre-compensating aberrations may be applied via the whole surface of the SLM, it is possible to have a large exit pupil. Because the pre-compensating aberrations are applied optimally to the ray bundles from each pixel subset of the source image 630, aberration correction is optimal over the entire field of view 660 of the optical system. The entire field of view is equivalent to the range of angles covered by the entire set of rays passing through the exit pupil 640.

There are three extreme cases, none of which is desirable. In the following description of extreme cases, the system of FIG. 5 is used as an example, but FIG. 6 and FIG. 4 can equally well be used to illustrate the extreme cases. In a first extreme case, that of a second element 510 that contains only one sub-element. The sub-element must necessarily have a very wide angular selectivity range so that the one sub-element will diffract all the incident rays from all the source image pixels of source image 530. It would be extremely difficult to design and fabricate a first element 510 capable of removing all the aberrations caused by that one sub-element for the rays from all the source image pixels. Moreover, the second element 520 in that case would likely diffract rays from a wide range of undesirable directions because of its very wide angular selectivity range.

In a second extreme case, the second element 510 contains one sub-element for every pixel in the source image 530. This would require the recording medium of second element 510 to contain a very large number of overlapped holographic sub-elements, which is not practical if the exit pupil 540 is to be large and the pixel count in the image is to be large. If this were practical, an aberration-free image could be viewed from the exit pupil 540; but unfortunately, it is not practical using currently available recording media.

In a third extreme case, the second element 510 contains only one sub-element, while the first element 520 contains one sub-element for each pixel of the source image. This is not practical because it, too, requires the recording medium of element 520 to contain a very large number of overlapped sub-elements.

On the other hand, and according to the current disclosure in the arrangement of FIG. 5, both second element 510 and first element 520 can be designed with an intermediate number of sub-elements. This can greatly reduce the amount of overlap in both elements, while greatly reducing the amount of aberration remaining after correction by the sub-elements of first element 520.

As is known to those skilled in the art, overlap of somewhat more than 1000 holographic sub-elements, each with a diffraction efficiency of 1%, in a volume recording medium can be accomplished using recording media that are commercially available today. If, for example, the source image contains 1,000,000 pixels divided into 100 contiguous subsets, and if the exit pupil area is 1/10 of the area of second element 510, and if the ray bundle from each source image pixel subset illuminates 1/10 of the first element 520, then approximately 40 sub-elements will be overlapped at each point of the first element 520, resulting in a diffraction efficiency on the order of 15% per sub-element; and approximately 40 sub-elements will be overlapped at each point of the second element 510, resulting in a diffraction efficiency of approximately 15%, for a cumulative efficiency of 2.25%.

Without first element 520, there will inevitably be aberrations in the optical system due to the second element 510 even when different subsets of image source pixels are diffracted by different sub-elements of second element 510. However, with the first element 520 included, residual aberrations due to the second element's sub-elements can be separately corrected by sub-elements of the first element.

If the angular selectivity ranges of the various sub-elements in the first element 520 do not overlap, and the angular selectivity ranges of the various sub-elements in the second element 510 do not overlap in their angular selectivity ranges, then light from each subset of the source image pixels will only be effectively diffracted by corresponding sub-elements of the first and second elements.

An alternative aspect of the disclosure illustrated in FIG. 6 employs a phase-only spatial light modulator in place of the first element 520 of FIG. 5. In the case of the arrangement of FIG. 6, the multiplex function of the first element is performed temporally instead of angularly.

Figure 7:
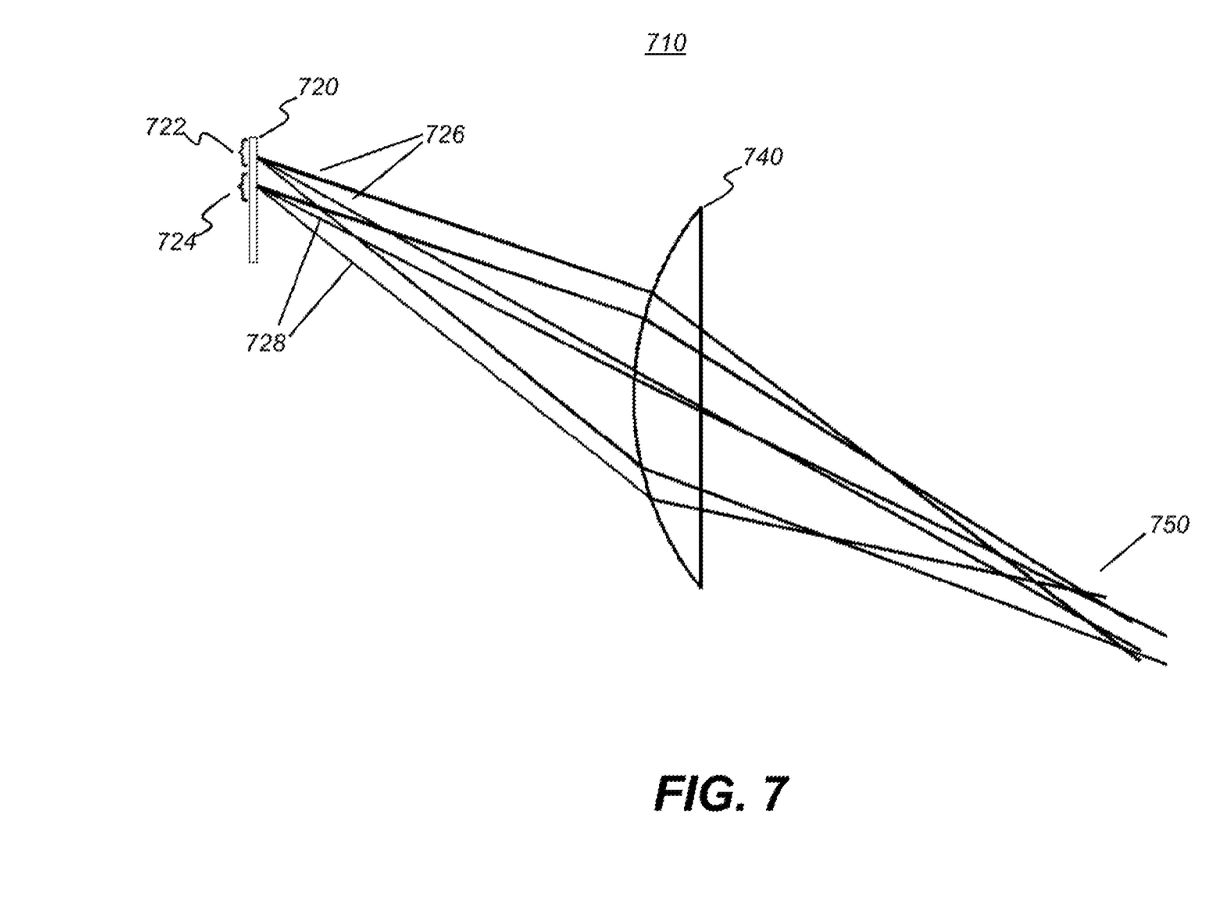
FIG. 7 is a schematic diagram that shows an optical imaging system with optical aberration.

FIG. 7 is a schematic diagram that shows an optical imaging system 710 comprising an image source 720 having at least a first source region 722 and at least a second source region 724. Rays 726 represent the light emitted from a pixel of first source region 722. Similarly, rays 728 represent the light emitted from a pixel of said second source region 724. It is to be understood that the emitted rays 728 need not correspond in time to the emission of rays 726. In this way, the emission from the array of pixels of image source 720 may be modulated separately and sequentially for each source region (e.g., 722 and 724). Said modulation may be controlled by, for example, but not limited to, a computer (not shown). Optical imaging system 710 further comprises an optical element 740 having optical power. Though represented in FIG. 7 as a lens, optical element 740 may be any combination of lenses, mirrors, and reflective or transmissive diffractive elements. Optical element 740, having optical power, will refract rays 726, 728 and direct the resulting refracted rays to a focus region 750 of optical system 710.

In one arrangement, optical element 740 is a reflective mirror with optical power. In another arrangement, optical element 740 is a portion of a curved reflective mirror. In yet another arrangement, optical element 740 is a reflective hologram formed by a diverging reference beam and a collimated object wave. When optical element 740 is a reflector with optical power, emitted source rays 726, 728 are reflected by optical element 740 and are focused to a focal region 750. In one arrangement, said focal region 750 is a virtual focal region. In another arrangement, said focal region is a real image surface.

Continuing with FIG. 7, source rays 726, 728 after passing through optical element 740 will have optical aberrations. That is, the wave fronts, also known as the phase fronts, represented by the refracted rays will no longer be a portion of a perfect sphere shape. Due to the aberrations, the image formed in focus region 750 will be degraded. As is known to those skilled in the art, the aberrations of an optical imaging system can be determined by computer simulation, as well as by interferometric means of the optical imaging system itself. In this way, it is known which optical aberrations contribute most to degradation in the reconstructed image and need to be compensated for.

Figure 8:
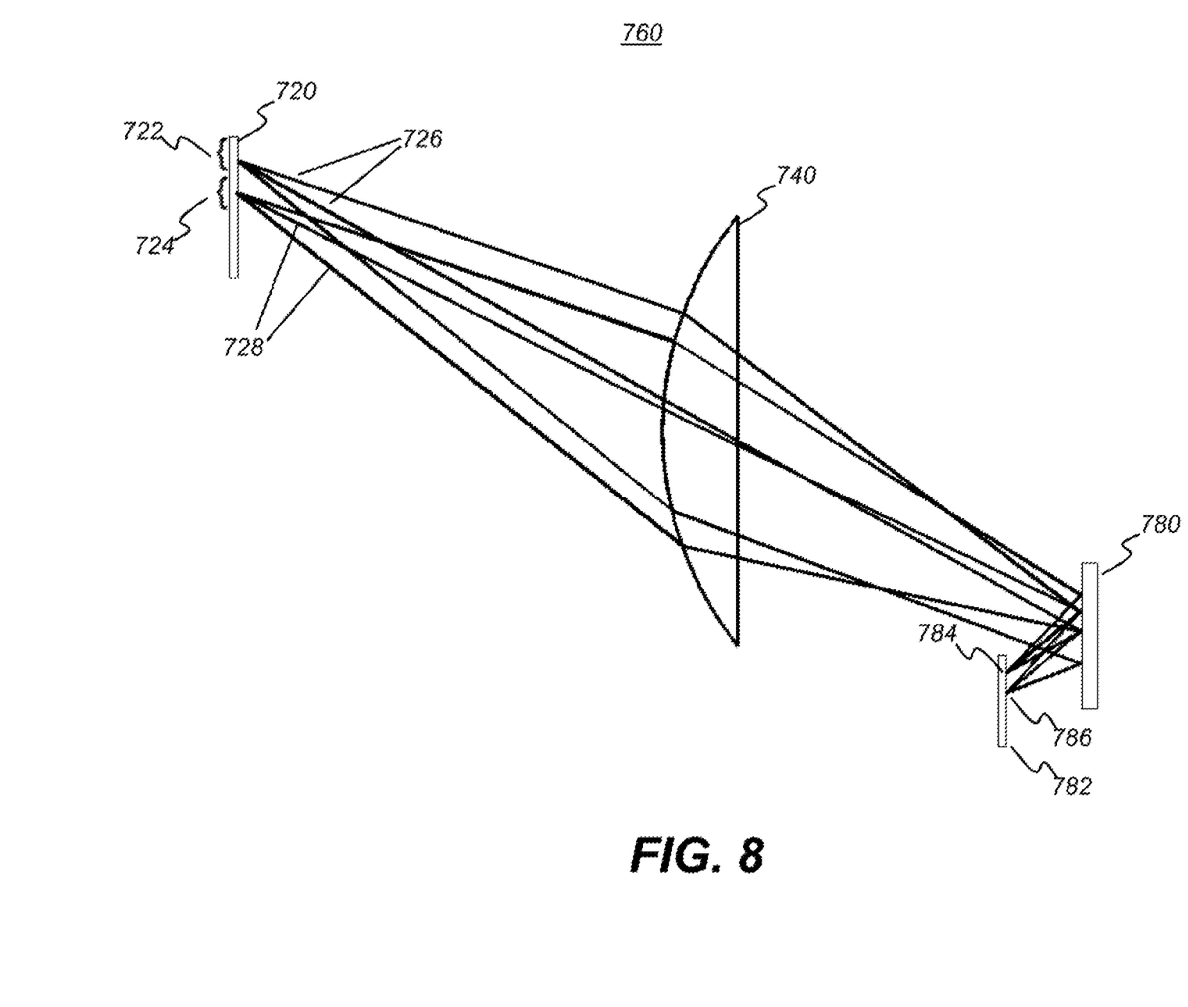
FIG. 8 is a schematic diagram that shows an optical imaging system with optical aberration correction according to one aspect of this disclosure.

FIG. 8 is a schematic diagram that shows an optical imaging system 760 wherein like numbers correspond to like elements (between FIG. 1 and FIG. 2). Optical imaging system 760 further comprises a phase-only spatial light modulator (SLM) 780 operating in reflection mode. As is known to those skilled in the art, a phase-only liquid crystal on silicon (LCOS) display can serve as a phase-only SLM. In another arrangement, any of the spatial phase modulators used in adaptive optics (such as a deformable mirror or a membrane array modulator), may be used as a phase-only SLM. U.S. Pat. No. 3,796,480, "Membrane light modulator", of K. Preston, and all U.S. and European patents that reference U.S. Pat. No. 3,796,480, are hereby incorporated by reference.

By including a phase-only SLM 780 in an optical system as an optical aberration correcting element, it is possible to correct different portions of a field of view (FOV) individually via computer and software (hardware and firmware).

U.S. Patent Application number US2013/0187950 A1, (Nowatzyk), and the article, "Holographic Near-Eye Displays for Virtual and Augmented Reality" (Maimone et.al) ACM Transactions on Graphics, Vol. 36, No. 4, Article 85. Publication date: July 2017, (collectively referred to herein as "the Microsoft approach") describe a display system with aberration correction.

Aberration correction is accomplished in the Microsoft approach by adjusting the spatial distribution of phase delays on the SLM, in small regions of the SLM corresponding to correspondingly small portions of the field of view. For a display having a useful pixel count, this results in an extremely small exit pupil (also known as "eyebox")

In the current disclosure, correction for aberrations in a subregion of the field of view can be accomplished by the full area of the SLM 780. Each subregion of the field of view is corrected separately and sequentially, using the full area of the SLM 780. Consequently, the eyebox in the current disclosure can be much larger than in the Microsoft approach. In the current disclosure, for rays 726 from first source region 722, the SLM 780 is adjusted to compensate for the wave front (phase front) aberrations in the incident wave. Emitted source rays 726 are then turned off and emitted source rays 728 from second source region 724 are turned on and the SLM 780 is adjusted to compensate for the wave front aberrations induced by optical element 740. This process of turning off and on different pixels from different source regions while synchronously adjusting the phase-only SLM 780 according to which pixel, or source region the pixel is within, continues for the entire FOV of the optical imaging system 760. The synchronicity and the aberration compensation implemented by the SLM 780 for each source region may be controlled by a computer and software. As an example, if $1/100$ of the whole solid-angle FOV can be adequately corrected for wave front aberrations by the phase-only SLM 780, then the entire FOV can be corrected sequentially, $1/100$ of the FOV at a time.

As is known to those skilled in the art, currently manufactured SLMs have frame rates of up to 500 frames per second (fps). Because normal video displays run at 30 to 60 fps, high-resolution optical aberration correction can be done in accordance with the current disclosure for roughly $1/10$ of the full FOV, 100 times per frame, thereby attaining aberration correction over the full field of view.

Continuing with FIG. 8, and to the arrangement therein, the source rays 726 and 728 pass through optical element 740, inducing optical aberrations into the wave fronts that are compensated for, sequentially, by SLM 780. Source rays 726, 728 are then focused to image plane 782 positions 786 and 784, respectively.

As is known to those skilled in the art, a pair of phase SLMs can correct more than what one phase SLM can correct alone. This is illustrated by the fact that any given ray has four degrees of freedom (x,y,theta,phi) corresponding to where it passes through a surface (x,y), and its direction at that point (theta,phi). A first SLM can be used to direct a ray to the surface of a second SLM at (x,y); and the second SLM can redirect the ray to the desired direction (theta,phi). Thus, a pair of phase SLMs can transform one continuous light field into another continuous light field. In the context of this disclosure, "continuous light field" is a light field that can be characterized as a distribution of rays on a surface, each ray having a direction (theta,phi) and an x,y position on the surface.

As is known to those skilled in the art, some types of chromatic aberration can be corrected using a pair of phase-only SLMs, by generating diffractive chromatic aberrations designed to be opposite to, e.g., refraction induced chromatic aberrations. A first SLM can diffract light to provide angular chromatic dispersion, while a second SLM can redirect the diffracted, chromatically dispersed light.

The effective speed at which a phase SLM can accomplish optical aberration correction can be increased by taking advantage of the fact that the phase function required for optical aberration correction will change slowly across a FOV. The frame rate of an SLM is calculated based on the "switching time" of the liquid crystal used in the SLM: it takes a certain amount of time for the liquid crystal to be switched fully from one extreme state to an opposite extreme state. However, because the phase function for optical aberration correction changes slowly across a FOV, corresponding to the different source regions, sequential SLM phase functions will typically require only small changes, correspondingly requiring only small changes in the liquid crystal state of the phase-only SLM. As a result, it will often be possible for the phase-only SLM to make the necessary changes in its liquid crystal state in a much shorter time than the liquid crystal's switching time. Additionally, choosing an appropriate modulation function for turning on and off the pixels (or pixel regions of the image source) can impact the performance. If the pixels along a row of the image source display are turned on and off sequentially, say, from left to right in a scan raster pattern, then when the last pixel in the row is turned off the next pixel turned on may be the left most pixel in the next row down. In this case, there may be a large difference in the optical aberration compensation function required due to a large difference in the optical aberrations between the left and the right regions of the FOV. One may avoid this extreme by implementing a "Z" raster pattern in which, after the last pixel in the row is turned off, the next pixel to be turned on is the pixel just below the pixel that has just been turned off and the scan of pixels proceeds in the opposite direction to the scan direction of the previous row. In this way, large changes in the optical aberration function that the SLM needs to respond to can be minimized. Although individual pixels were used in this example, it is to be understood that the input source may be divided into pixel regions comprising more than one pixel. The "Z" raster pattern, and the changes to the phase SLM, is then applied to pixel regions of the input source rather than individual pixels.

Figure 9:
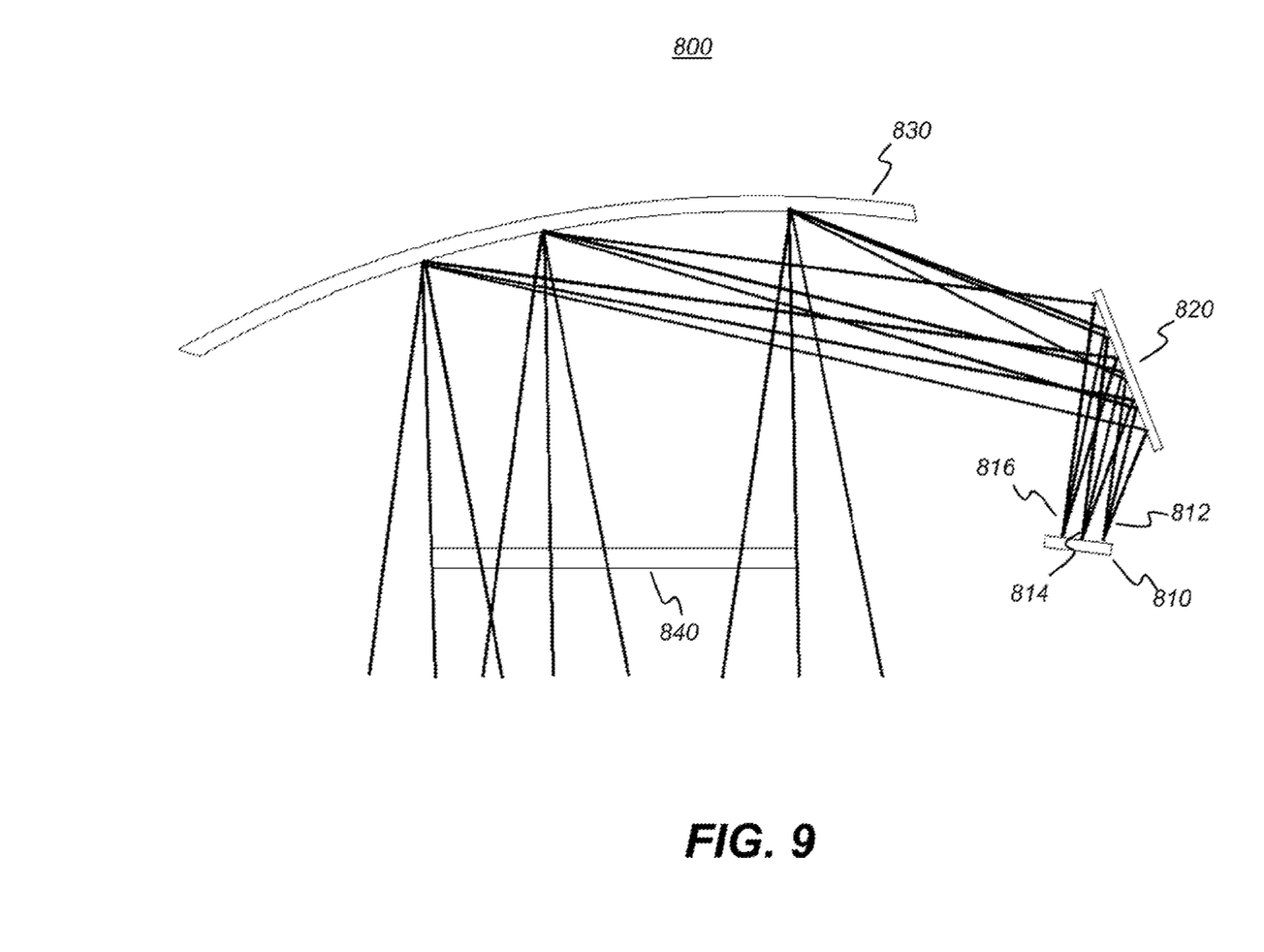
FIG. 9 is a schematic diagram of a near-eye head mounted display system with optical aberration correction.

FIG. 9 is a schematic diagram that shows an optical imaging system 800 in a near-eye augmented reality imaging system configuration. Optical imaging system 800 comprises an image source 810 that emits image ray bundles 812, 814, 816. Image ray bundles 812, 814, 816 represent the wave fronts (phase fronts) of the emitted light from image source 810. It is to be understood that ray bundles 812, 814, 816 are to be emitted in a time sequence. Emitted rays 812, 814, 816 are reflected from phase-only SLM 820 and are directed to reflective element 830. In one arrangement, reflective element 830 is an opaque reflector. In another arrangement, reflective element 830 is a semi-transparent optical element. In yet another arrangement, reflective element 830 is a holographic optical element on a transparent substrate. In one arrangement, reflective element 830 is essentially a flat surface. In another arrangement, reflective element 830 has a curved surface. After reflection from reflective element 830, ray bundles 812, 814, 816 proceed to, and form, the eye box 840 of the optical system. It is to be understood that the image source 810 may be where an image is formed from a preceding additional optical system (not shown). In this way, image source 810 is a relay, optically connecting the optical system 800 to another optical imaging system.

Continuing with FIG. 9 and to the arrangement illustrated therein, the phase-only SLM 820 is configured and operated to induce specific optical aberrations in the reflected wave fronts represented by the corresponding specific reflected ray bundles of source ray bundles 812, 814, 816. The induced optical aberrations by SLM 820 are designed to compensate for the optical aberrations induced in the wave fronts by the reflective element 830. In this way, the optical aberrations as seen at the eye box 840 are reduced or eliminated.

Figure 10:
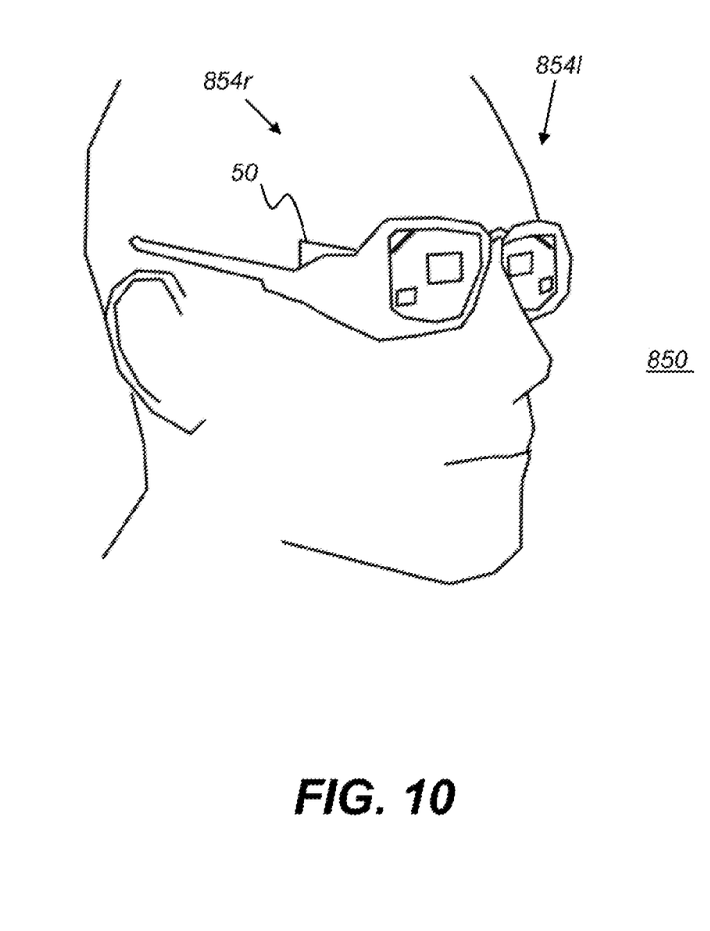
FIG. 10 is a perspective view that shows a display system for augmented reality viewing using imaging light guides of the present disclosure.

The perspective view of FIG. 10 shows a display system 850 for three-dimensional (3-D) augmented reality viewing using a pair of near-eye imaging systems including phase-only SLMs of the present disclosure (see FIG. 9 and the accompanying disclosure). Display system 850 is shown as a head mounted display (HMD) with a left-eye optical system 854l having a phase-only SLM optical aberration compensator imaging system (not shown) for the left eye and a corresponding right-eye optical system 854r having a phase-only SLM optical aberration compensator imaging system (not shown) for the right eye. An image source 860, such as a picoprojector or similar device, can be provided, energizable to generate a separate image for each eye, formed as a virtual image with the needed image orientation for upright image display. The images that are generated can be a stereoscopic pair of images for 3-D viewing. The virtual image that is formed by the optical system can appear to be superimposed or overlaid onto the real-world scene content seen by the viewer. Additional components familiar to those skilled in the augmented reality visualization arts, such as one or more cameras mounted on the frame of the HMD for viewing scene content or viewer gaze tracking, can also be provided. Alternate arrangements are possible, including a display apparatus for providing an image to only one eye.

Figure 11:
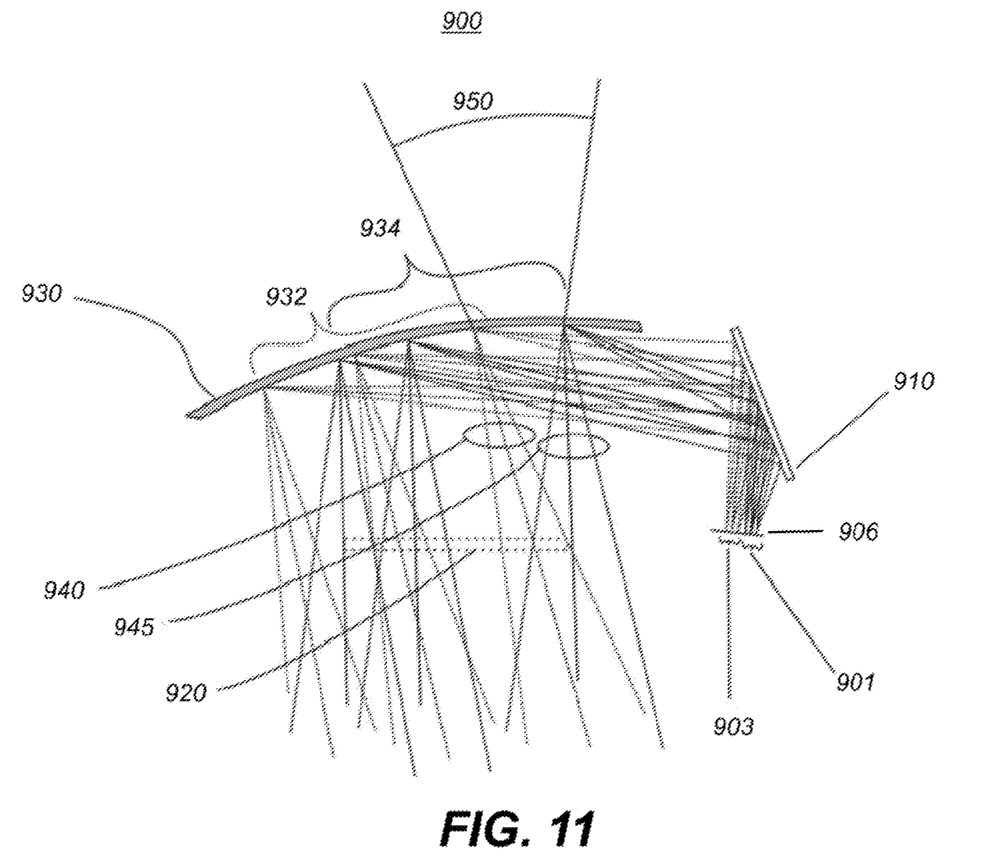
FIG. 11 is a schematic diagram of a near-eye head mounted display system with optical aberration correction and a wide eyebox.

Another arrangement is illustrated in FIG. 11. In this arrangement optical system 900 comprises multiplexed hologram element 930 that is a multiplexed hologram with one component hologram for each of a plurality of regions in the field of view, or equivalently for each of a plurality of subsets of input pixels 901, 903 in the input image 906. Optical system 900 further comprises an aberration correction element 910. Ray bundle 945 represents the rays emitted from input pixels in region 901, and ray bundle 940 represents the rays emitted from input pixels in region 903. Hologram portion 934 represents the portion of multiplexed holographic element 930 designed to diffract the rays from input pixel region 903, and hologram portion 932 represents the portion of multiplexed holographic element 930 that diffracts rays from input pixel region 901. Each such component hologram may be independently optimized to project a virtual image at infinity to the eyebox 920, from a corresponding subset of input image pixels, thereby accomplishing several goals:

1) minimizing the amount of aberration correction needed for each subset of the input image pixels;
2) allowing for a large field of view; and
3) allowing the element 930 to be comprised of angularly selective holograms, whose angular range effectively includes only those angles corresponding to the subset of the field of view which corresponds to the subset of input pixels.

The third goal above is important in see-through displays because any hologram that is not angularly selective will scatter ambient light, resulting in a foggy image.

Continuing with the arrangement depicted in FIG. 11, the field of view of optical system 900 is equal to the greatest angular separation between rays impinging on the eyebox 920. In this example the field of view is equal to angle 950. The portion of the field of view subtended by any contiguous set (e.g., 901, 903) of input pixel regions is relatively small, but the whole field of view can be large because it is the combination of all the fields of view of the separate input pixels. Although it is possible in principle to provide one component hologram of multiplexed holographic element 930 for each pixel of input image 906, in practice it is difficult to do so because there can easily be millions of pixels in an image and if the eyebox 920 size is more than a fraction of a millimeter, the needed amount of overlap of component holograms of multiplexed holographic element 930 can be well over a thousand. A greater amount of overlap results in a decreased diffraction efficiency per hologram component. Therefore, it is advantageous to design each component hologram to diffract light from only a corresponding limited contiguous subset of the input pixels, and to make each subset approximately 100×100 pixels.

The invention has been described in detail with reference to presently preferred embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An optical system, comprising:
an image source operable to emit a source image;
a first multiplex element;
a second multiplex element; and
an exit pupil,
the first multiplex element providing a first set of aberrations to ray bundles emanating from subsets of pixels of the source image, and
the second multiplex element providing a second set of aberrations to the ray bundles, such that the first set of aberrations is substantially cancelled by the second set of aberrations,
wherein the second multiplex element comprises a spatial light modulator positioned optically between the image source and the exit pupil, and wherein the first multiplex element is positioned optically between the second multiplex element and the exit pupil and is operable to direct the ray bundles to the exit pupil.

2. The optical system of claim 1, wherein the second multiplex element is operable to impose a temporally multiplexed set of aberrations to the ray bundles.

3. The optical system of claim 1, further comprising:
a controller,
wherein the second multiplex element comprises a phase-only spatial light modulator, the phase-only spatial light modulator having a plurality of regions,
wherein the controller is operable to synchronize a state of pixels of the image source corresponding to the plurality of regions of the phase-only spatial light modulator and a phase function state of the phase-only spatial light modulator, and
wherein the phase function state of the phase-only spatial light modulator substantially corrects optical aberrations induced by the first multiplex element via inducing compensating optical aberrations in light emitted from the image source.

4. The optical system of claim 1, wherein the optical system forms a virtual image.

5. The optical system of claim 1, wherein the optical system is a near eye display apparatus.

6. The optical system of claim 1, wherein the optical system is an off- axis display apparatus.

7. The optical system of claim 1, wherein the optical system is a TIR-illuminated HOE near-eye display.

8. The optical system of claim 1, wherein the first multiplex element comprises a multiplexed holographic optical element.

9. The optical system of claim 8, wherein the multiplexed holographic optical element comprises a volume recording medium having a plurality of holographic sub-elements.

10. The optical system of claim 9, wherein the plurality of holographic sub-elements are overlapping.

11. The optical system of claim 9, wherein each of the plurality of holographic sub-elements is operable to diffract only a corresponding ray bundle emanating from the subsets of pixels of the source image.

12. The optical system of claim 8, wherein the multiplexed holographic optical element includes a plurality of sub-elements operable to collimate the ray bundles.

13. The optical system of claim 1, wherein the spatial light modulator switches sequentially between phase configurations, applying a different set of aberrations with each phase configuration.

14. A method of correcting optical aberrations in an optical system, comprising:
providing an image source operable to emit a source image;
determining optical aberrations across a field of view;
dividing the source image into a plurality of regions, wherein each region comprises at least one pixel;
providing a first multiplex element, wherein the first multiplex element provides a first set of aberrations to ray bundles emanating from subsets of pixels of the source image;
providing a second multiplex element;
using the second multiplex element to provide a second set of aberrations to the ray bundles, such that the first set of aberrations is substantially cancelled by the second set of aberrations,
wherein the first multiplex element is positioned optically between the second multiplex element and an exit pupil and is operable to direct the ray bundles to the exit pupil; and
using the first multiplex element to form an output image, wherein the second multiplex element comprises sub-elements, each sub-element corresponding to a subset of contiguous pixels of the source image, wherein the second multiplex element comprises a spatial light modulator positioned optically between the image source and the exit pupil, wherein the first multiplex element comprises static sub-elements, each sub-element corresponding to at least one sub-element of the second multiplex element, and wherein each sub-element of the second multiplex element is operable to induce pre-compensating aberrations in ray bundles emanating from one of the plurality of regions of the source image to correct aberrations induced by the corresponding sub-element of the first multiplex element.

15. The method of correcting optical aberrations in an optical system according to claim 14, further comprising:

determining phase functions of the second multiplex element operable to compensate for optical aberrations per each region of the source image;

connecting a programmable controller to the phase-only spatial light modulator and to the image source; and programing the controller to synchronize a state of the at least one pixel of each region of the source image and the phase function of the phase-only spatial light modulator;

wherein the controller is operable to change the state of the at least one pixel of each region of the source image such that the at least one pixel in at least one region of the source image at a time are activated, the controller changing the state of the phase-only spatial light modulator to compensate for optical aberrations per each region of the source image.

16. A method of correcting optical aberrations in an optical system, comprising:

determining optical aberrations across a field of view;

dividing an image source operable to emit a source image into a plurality of regions, each region comprising at least one pixel;

providing a first multiplex element comprising a multiplexed holographic optical element, wherein the first multiplex element provides a first set of aberrations to ray bundles emanating from subsets of pixels of the source image;

inserting a second multiplex element optically between the image source and an exit pupil, wherein the second multiplex element comprises a phase-only spatial light modulator operable to provide a second set of aberrations to the ray bundles, such that the first set of aberrations is substantially cancelled by the second set of aberrations, wherein the multiplexed holographic optical element is positioned optically between the phase-only spatial light modulator and an exit pupil and is operable to direct the ray bundles to the exit pupil;

determining phase functions of the phase-only spatial light modulator operable to compensate for the optical aberrations per each region of the image source;

connecting a programmable controller to the phase-only spatial light modulator and to the image source; and programing the controller to synchronize a state of the pixels in the plurality of regions of the image source and the optical aberration corrective phase function of the phase-only spatial light modulator;

wherein the controller changes the state of the pixels in the plurality of regions of the image source such that pixels in at least one region at a time are activated, the controller changing the state of the phase-only spatial light modulator to compensate for the optical aberrations per each region of the image source.

* * * * *